Nov. 12, 1968 L. J. FRANK 3,410,702
PREPARATION OF A DEHYDRATED POTATO PRODUCT WHICH CAN
BE RECONSTITUTED INTO HASH BROWN POTATOES
Filed Nov. 22, 1965
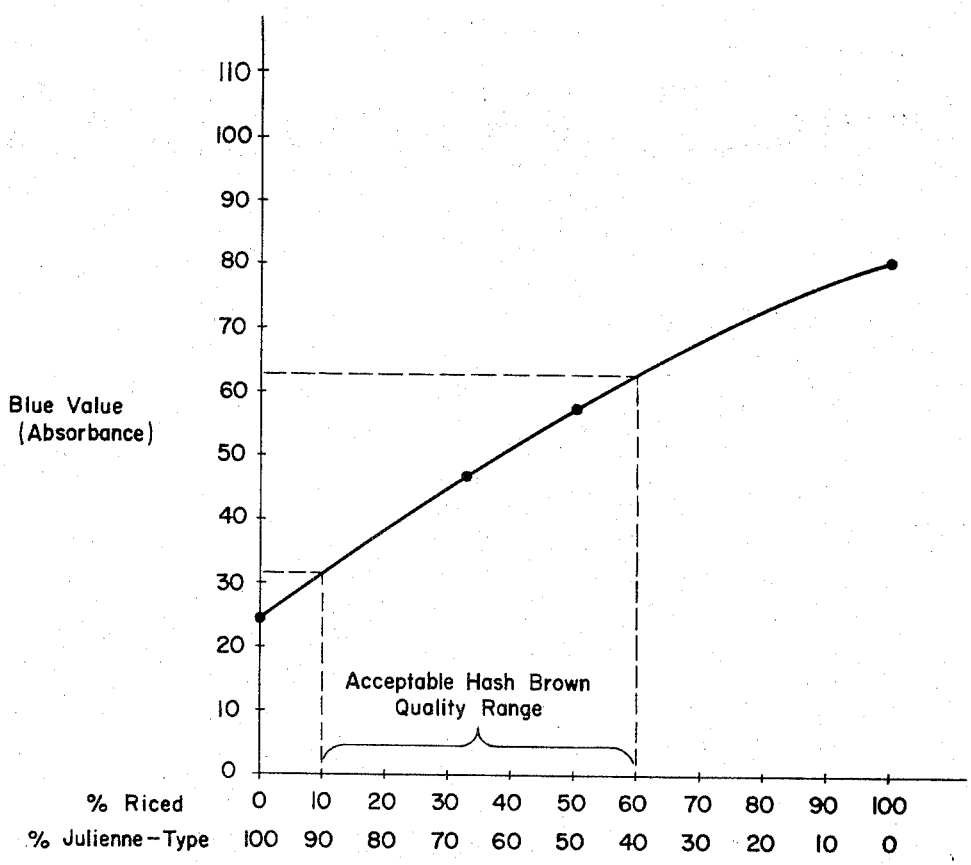
INVENTOR.
LOUIS J. FRANK
BY
ATTORNEYS

United States Patent Office 3,410,702
Patented Nov. 12, 1968

3,410,702
PREPARATION OF A DEHYDRATED POTATO
PRODUCT WHICH CAN BE RECONSTITUTED
INTO HASH BROWN POTATOES
Louis James Frank, 101 Reservoir Road,
Hillsborough, Calif. 94010
Filed Nov. 22, 1965, Ser. No. 508,906
10 Claims. (Cl. 99—207)

This invention relates to an improved dehydrated potato process and product and, more particularly, to a combination of dehydrated potatoes adapted to be reconstituted for the preparation of hash brown potatoes.

Hash brown potatoes are conventionally prepared by steaming or boiling whole potatoes, cooling, and thereafter forming potato pieces or strips (commonly referred to as julienne strips) by cutting the cooked potatoes. This cooking and cutting destroys a number of the cell walls and releases gelatinous starch, which when fried, produces the desirable adherence of the individual strips to each other to obtain the well-known product.

However, when the potato strips are not fried immediately, the presence of this "free" starch is undesirable. The "free" starch reacts with other unbroken cell walls in the strips, causing their rupture, which in turn destroys the individual nature of the strips. Thus, the eventual hash brown product which is obtained contains lumps or clumps rather than the distinct textured strips desirable in hash browns. The "free" starch is additionally undesirable during dehydration of the strips because it causes the individual pieces to stick together, thereby complicating and prolonging the drying process. In addition, the dehydrated strips, from which the free starch has not been removed, do not reconstitute rapidly.

In order that potato pieces, which are to be used for the preparation of hash browns, will maintain their individuality and attractive size and not stick together during dehydration, the strips must be thoroughly washed prior to dehydration to remove substantially all the "free" starch created during cooking and cutting. However, such a washed product does not stick together and, therefore, does not produce an attractive hash brown product, because the "free" starch, essential as the adhesive mechanism between the individual reconstituted potato strips when fried, has been removed.

As a result of these factors, present dehydrated potato strips, commercially available for the preparation of hash browns, do not reconstitute rapidly, do not possess the desired textured characteristics of hash browns prepared from fresh potatoes and generally do not attain an eye-appealing form normally associated with the fried product.

Therefore, broadly stated, the present invention, as described in greater detail hereinafter, is drawn to a unique combination of dehydrated potatoes which have been prepared by two distinctly different processes, yet reconstitute quickly and when fried, produce a desirable hash brown product. The two potato components of the product are formed and prepared so as to remain in the desired physical proportions during packaging and shipping. The pieces do not stratify or lose this desired proportional arrangement even during long periods of shipping and storage. This invention also recites the method of preparation necessary to produce a dehydrated potato product which overcomes the aforementioned disadvantages present in the prior art. These aspects will be more clearly set forth and other objects will become apparent from the description of the invention as given hereinafter, especially with reference to the drawing, wherein:

FIG. 1 is a graph depicting, in dehydrated potato combinations which have been rehydrated, the relationship between variations in the amount of the riced portion and the amount of free amylose present, measured as blue value.

Now, in accordance with this invention, it has been found that an instantly reconstitutable potato product, suitable for the preparation of hash browns, can be prepared by combining, especially in certain desirable proportions, blanched potato pieces from which free starch has been removed prior to dehydration, with other potato pieces which have been fully cooked, riced and dehydrated without washing after the cooking step.

Although it is not intended for the invention to be limited to any specific theoretical concept, it appears that the starch molecule, amylose, a linear polymer substantially made up of all 1,4-alpha-glucoside linkages, which comprises a portion of the potato starch, is freed by the cutting and cooking of the potato pieces. The amylose appears to contribute the adhesive characteristics so necessary to the preparation of an appetizing hash brown product. Amylose is readily soluble in water and will be substantially completely removed from the blanched pieces, for example, by washing prior to dehydration. However, the fully cooked diced potatoes remain unwashed, i.e., are not washed prior to ricing and dehydration and, therefore, retain a high "free" amylose concentration. Therefore, when certain combinations of blanched pieces, preferably julienne-type strips, and amylose rich riced potatoes are reconstituted in hot water, part of the amylose fraction in the riced portion is released, forming an adhesive which coats the strips while the riced particles further adhere to the strips, thereby creating a compact mass, cake or patty. When the rehydrated combination is further treated by frying, the blanched pieces give the resulting hash browns the necessary texture. It appears that the amount of free amylose introduced by the rehydrated riced portion exceeds that present in hash browns prepared from fresh potatoes.

When carrying out the process of the instant invention, a first quantity of whole, white opaque potatoes are divided into pieces such as julienne-type strips. The pieces are partially cooked (precooked) for a time sufficient to destroy the peroxidase present. This is most effectively accomplished by blanching for from 5 to 10 minutes in water which, preferably contains either sodium chloride, sodium acid pyrophosphate or a combination of the two. The free starch produced by the cutting and precooking is then thoroughly removed such as, for example, by means of washing to prevent the pieces from sticking together during dehydration. These blanched and washed strips are then subjected to conventional dehydration.

A second portion of either similar or dissimilar whole, white opaque potatoes are conventionally peeled, trimmed and cut into small pieces, for example, diced. These uncooked pieces can be washed, but it is usually not desired. These pieces are then cooked in a conventional manner for at least about 20 minutes. The fully cooked pieces, now containing free starch, which must not be washed away, are riced in a conventional ricing machine. The ricing process destroys more of the cell structure thereby releasing further amounts of amylose, i.e., "free" starch. The riced product is dried to a low moisture concentration and relatively short pieces of irregular conformation are obtained.

The dehydrated strips and riced product are then combined in the critical proportions set forth herein. The dried riced potatoes and julienne strips are found to be of roughly comparable shape which enables the two components to be combined without subsequent separation or stratification in the package. The product is further unique in that the individual dehydrated strips and rice are free flowing, i.e. they do not stick together. The combined product has been found to reconstitute rapidly, and forms a coherent mass, which when fried develops the attractive appearance and texture of fresh hash browns.

The term "strips" as used herein includes potato pieces which, prior to dehydration, are about ½" to 1½" long, about ¼" to ½" wide and from about 1/16" to 5/16" thick, and may take various shapes. Preferably a "julienne strip" is employed. Although the size of the pieces is in no way critical, it is desirable that one dimension be no greater than about ¼" to insure uniform and sufficient drying. The resulting dehydrated strips usually display a minor amount of shrinkage in overall dimensions from that of the raw pieces.

The raw potato portion which is to be treated by fully cooking and ricing is preferably first diced into cube-shaped pieces about ½" on a side. The resulting riced portion, when dehydrated, forms rough, irregular, curled and twisted pieces about ⅛" in diameter and up to about ¾" long. Of course, these dimensions, as well as any others which are set forth in this specification, can be varied by one of skill in the art and will depend on the properties of the actual potatoes as well as the actual processing procedures.

It has been found that the advantages of this invention are obtained when the strips comprise from about 40–90%, by weight, of the total dehydrated combination and especially when from 60–70%, by weight, julienne strips are incorporated in the combination.

Blue value, as used throughout this disclosure, represents the amount of free amylose present in the reconstituted product and is therefore a measure of the stickiness of the rehydrated product. The blue value represents the relative amount of 600 millimicron light absorbed by a sample of the rehydrated product which has been mixed with a dilute iodine solution. The free amylose in the sample reacts with the iodine to produce a blue color which increases in intensity as the amylose concentration increases. By comparing the light absorbency of the amylose-iodine solution with the light absorbency of distilled water as a standard, i.e. as zero, the variations in the concentration of free amylose, as the diced portion of the dehydrated combination is varied, are measured in terms of what is commonly referred to as the "blue value."

This is most clearly illustrated by referring to FIG. 1 wherein the blue values of the dehydrated products containing various concentrations of strips and riced potatoes have been plotted. In order to assure a suitable reconstituted final product, the blue value must be between 30 and 65 and preferably about 45.

In another aspect of the invention, it has been found that when up to 10% by weight of the total combination of conventional potato starch is added to the dehydrated strips and riced portion, either in a dry form during the combination thereof or to the cooked diced portion prior to ricing, the amount of riced potato employed can be substantially decreased. For example, when about 8% potato starch is incorporated along with the riced portion, the optimum level of stickiness, i.e. a blue value of about 45, will be obtained even though the proportion of strips is raised to 75% by weight of total product. This is appreciably higher than the optimum 67% portion of strips when combined only with dehydrated riced potato. As a result of this higher concentration of the blanched portion, i.e. the strips, the overall appearance of the resulting hash browns is enhanced.

It is preferred to add the potato starch to the cooked diced potatoes before ricing, so that the potato starch will be embedded in the resulting riced potatoes and thus will not separate during the final packaging process or upon storage. By introducing up to about 10% by weight of potato starch, the riced portion can advantageously be reduced to about 5% to 40% by weight, and the dehydrated blanched strips can be employed in an amount from about 55 to 85% by weight.

The term "instantaneously" reconstitutable, broadly speaking, is meant to include the ability to rehydrate in hot water (150–212° F.) in less than four minutes and preferably in about two minutes.

The term "blanching," as applied to the julienne-type strips, is well-known to those of skill in this art and includes heating either in steam or in water. In steam blanching, the potatoes are heated by exposure to atmospheric steam, for example, on stainless steel draper conveyor belts, stainless steel screw conveyors, or the like. Steam blanching has the advantage of producing less leaching of soluble solids than water blanching.

When water blanching is utilized the addition of the aforementioned salts can be most effectively accomplished. In this regard, the amount of sodium chloride or sodium acid pyrophosphate which is added to the water blanch may be varied widely. For example, up to 5% of either or both is suitable. Of course, depending on the type of potatoes treated, the incorporation of salt may be unnecessary.

Blanching times can be varied considerably and will depend upon the temperature used, the size of the potato pieces, product load on the blancher, the uniformity of distribution, variety and maturity of the potatoes being processed, and the degree of cooking desired. For example, blanching temperatures in the temperature range of atmospheric steam, i.e. 190–212° F., have been found to be effective.

Washing of the strips should be accomplished immediately following blanching and may employ either a rinsing spray or thorough soaking, with warm or cold water, to remove the gelatinized starch from the blanched strips.

In a preferred aspect of the invention, both the potato strips and rice pieces are subjected to a sulfite treatment. The sulfite is applied to the strips immediately after washing, for example, as a spray of a solution of sodium sulfite, sodium bisulfite or sodium metabisulfite or combinations thereof. With respect to the portion which will be riced, it is most effective to incorporate the salts during cooking.

Sulfiting is advantageous as it permits the use of higher temperatures during dehydration, thus increasing the rate of drying and the equipment capacity. The sulfite further protects the product from non-enzymatic browning or scorching during dehydration and increases the storage life of the product when subjected to adverse temperature conditions. Sulfites have been found to be advantageous when present in amounts, measured as $SO_2$, of from 100–300 parts per million.

In still another preferred aspect, dextrose or another suitable form of sugar may be added in minor amounts, i.e. up to 3.0%, to the strips in the washing solution. The riced portion which is not washed, retains a greater proportion of the natural reducing sugars and therefore, dextrose or the like, need not be added thereto. It is known that sugar will enhance the browning characteristics of dehydrated potatoes. Of course, the amount of sugar utilized will be dependent on the level of the naturally-occurring reducing sugars retained after the cooking operation.

Conventional ricing equipment consists of an outer metal cylindrical housing perforated with small counter-sunk holes. Inside the housing is a smooth smaller diameter cylinder extending co-axially the length of the larger cylinder and spaced concentrically within the inside wall of the perforate housing. Both cylinders revolve, catching the potatoes between them, thereby shearing the dices and extruding the product through the perforations, which are conveniently transported on devices such as screen trays to dehydration.

It has been found to be preferred to employ ricing equipment having perforations in the form of 3/8" round holes. However, variations in the size of the openings, i.e. from 1/8" to as large as about 5/8" are advantageous. In addition, the advantages of the ricing process can be obtained even when the configuration of the perforations are varied, i.e. when the perforations are elongated, elliptical, rectangular as well as oval.

The dehydration is well known to the art and is accomplished in any of the multiplicity of conventional dehydrating equipment. For example, cabinet, tunnel and conveyor dryers and the like are all effective.

The dehydrating step has little effect on the size of the blanched strips but the riced potato breaks up into relatively small pieces of generally uniform size approximating a large rice hull or slightly larger, during ricing and dehydration.

To further illustrate the novel process, the following example is provided:

10 lbs. of whole, white opaque potatoes were cut into julienne strips about 1/4" x 1/8" x 1" and blanched in an aqueous 4% sodium chloride solution at 198° F. for 7 minutes. The strips were then thoroughly washed in a 2% aqueous dextrose solution and dehydrated to about a 6% moisture content.

An additional 5 lbs. of whole, white opaque potatoes were diced into 3/8" cubes and heated for about 20 minutes at 198° F., until completely cooked. The cooked diced potatoes were not washed as washing would have caused the individual pieces to dissolve into a starchy paste. The diced potatoes were then riced and the resulting product extruded as spaghetti-like strings about 1/4" in diameter, breaking irregularly into about 1/2" lengths. The pieces were dehydrated to about a 7% moisture content and the resulting dehydrated portions were of irregular shape and less than about 1/2" long.

The dehydrated blanched julienne-type strips and dehydrated cooked riced potato, transported by separate conventional blending equipment, were thoroughly combined. After a lengthy storage period, the product was added to a sauce pan containing 1.5 cups of boiling tap water per 100 grams of dehydrated product. The water was seasoned with salt and pepper. The sauce pan was removed from the heat source and allowed to stand for about 3 minutes. The reconstituted combination was easily spread into thin irregular layers and fried on an oiled skillet. The resulting hash brown cake was appetizing in appearance and texture, closely resembling hash browns prepared from the fresh tuber.

Because of the comparative sizes of the dehydrated blanched strips and dehydrated riced quantity, they did not separate or settle out but remained uniformly dispersed throughout the consumer package.

Although the foregoing invention has been described in some detail by way of illustration and example for purposes of clarity of understanding, it will be understood that certain changes and modifications may be practiced within the scope of the invention as limited by the scope of the appended claims.

What is claimed is:

1. A process for preparing a dehydrated potato product of improved natural flavor, suitable for instant reconstitution and subsequent conversion to hash brown potatoes, comprising: cutting a first quantity of said potatoes into strips; blanching said strips; removing free starch from said strips; dehydrating said strips; cutting a second quantity of said potatoes in pieces; heating said cut second quantity until substantially cooked; ricing the substantially cooked quantity while retaining the released starch; dehydrating the free starch rich riced quantity; and thereafter combining the first and second dehydrated quantities uniformly in such proportions that the resulting composition when subjected to reconstitution and frying will be converted to hash brown potatoes.

2. A process in accordance with claim 1 wherein the strip and riced potato are combined so that said product contains about 40–90%, by weight, of strips.

3. A process in accordance with claim 1 wherein up to about 10% by weight of the total combination, of potato starch is added to the cooked second quantity prior to ricing of said second quantity.

4. A process in accordance with claim 1 wherein said strips are blanched in about a 3% dextrose solution and the free starch is removed by an aqueous wash.

5. A process according to claim 1 wherein the strips and riced potato pieces are each up to about 1/4" in thickness prior to dehydration.

6. A process in accordance with claim 1 wherein the the first quantity is cut into julienne strips and the second quantity is prepared by dicing.

7. A dehydrated free flowing potato product of improved natural flavor, suitable for instant reconstitution and subsequent conversion to hash brown potatoes, comprising the combination of 40–90%, by weight, of first potato strips, which have been prepared by blanching, removing free starch, and dehydrating; and 60–10%, by weight, of riced potatoes which have been prepared by cooking, ricing and dehydrating the unwashed riced potatoes.

8. A dehydrated product in accordance with claim 7 wherein the strips are in the form of julienne strips.

9. A dehydrated product in accordance with claim 7 wherein the riced portion contains up to about 10% potato starch which has been added prior to ricing thereof.

10. A dehydrated product in accordance with claim 7 wherein the dehydrated strips are about 3/4 inch long and 1/4 inch in diameter and the dehydrated riced potato comprises irregular shaped pieces of about 3/4 inch long and 1/8 inch in diameter and wherein the combined strips and riced potato pieces are uniformly distributed relative to each other.

References Cited

UNITED STATES PATENTS

Montagne, P.: Larousse Gastronomique, The Encyclopedia of Food, Wine and Cookery 1961, Grown Publ. Inc., New York (p. 66).

A. LOUIS MONACELL, *Primary Examiner.*

D. M. NAFF, *Assistant Examiner.*